H. G. DYER.
FLAME ARC LAMP.
APPLICATION FILED JAN. 12, 1912.

1,049,687.

Patented Jan. 7, 1913.

WITNESSES:
Agnes E. Caskey
Edgar C. Van Dyke

INVENTOR.
Henry G. Dyer.
BY William J. Jackson,
ATTORNEY.

UNITED STATES PATENT OFFICE.

HENRY G. DYER, OF COLLINGSWOOD, NEW JERSEY.

FLAME ARC-LAMP.

1,049,687.  Specification of Letters Patent.  Patented Jan. 7, 1913.

Application filed January 12, 1912. Serial No. 670,859.

*To all whom it may concern:*

Be it known that I, HENRY G. DYER, a citizen of the United States, residing at Collingswood, in the county of Camden and State of New Jersey, have invented Improvements in Flame Arc-Lamps, of which the following is a specification.

Heretofore in constructing electric flame arc lamps, it has been customary to build a lamp of special design. Obviously, this renders the lamp construction expensive.

The present invention has for its principal object to overcome this disadvantageous feature and construct a lamp fixture, which may be readily and expeditiously attached to or removed from ordinary and existing types of electric arc lamps, whereby an electric arc lamp may, if desired, be used interchangeably as an electric arc lamp or an electric flame arc lamp at comparatively small cost and without change of construction of the original lamp parts.

A further object of the present invention may be said to reside in the providing of a lamp fixture complete in itself, adapted for detachable connection to an existing type of electric arc lamp, the construction of said fixture being such that the vapors given off by the carbons are caused to pass in the form of a continuous cycle around the lamp.

A still further object of the present invention is to provide a lamp fixture of the inclosed type provided with a hollow carbon, whereby the vapors or gases given off by the carbon are caused to pass in the form of a continuous cycle around the lamp and up through the hollow carbon, so that the vapors or gases are maintained for a long period of time in and are calculated to be entirely consumed by the flame of the arc.

A still further object of the present invention is to reduce to a minimum deposits of carbon within the lamp fixture.

Other objects of the invention relate to the providing of general details of construction and arrangement of parts as will hereinafter more fully appear.

The invention consists of the improvements hereinafter described and finally claimed.

Figure 1:
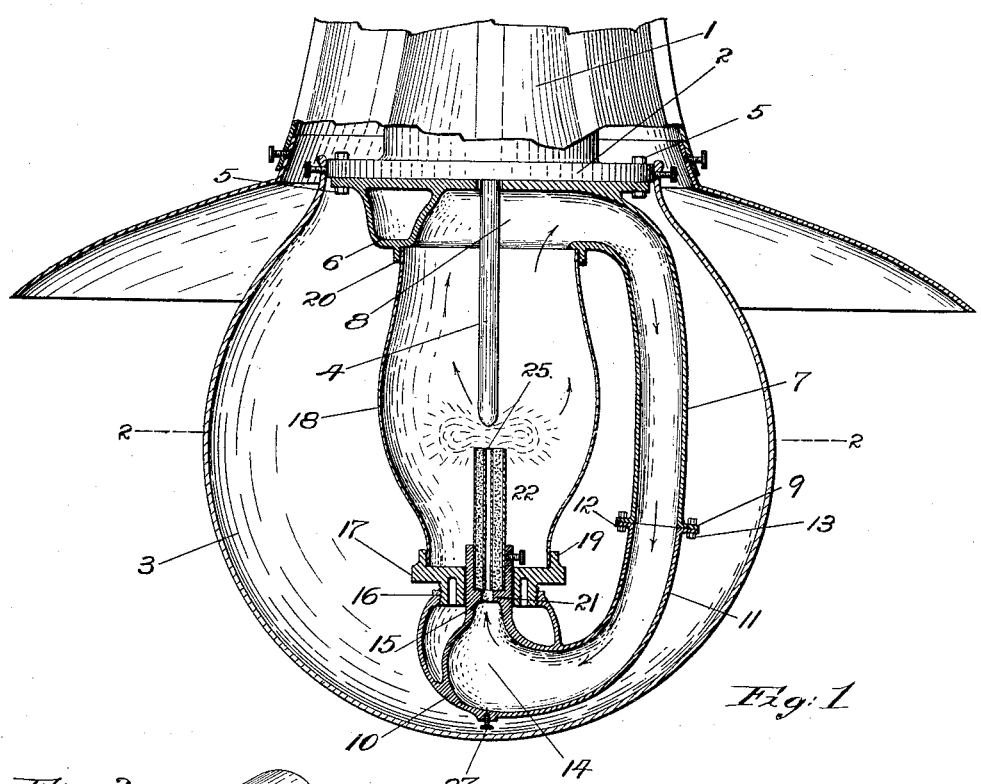
Figure 3:
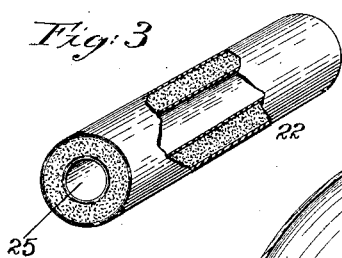
Figure 2:
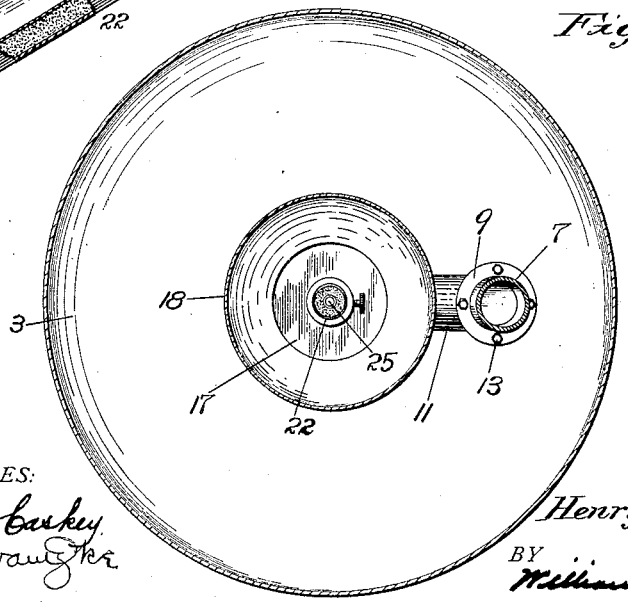

The nature, characteristic features and scope of the invention will be more fully understood from the following description taken in connection with the accompanying drawings forming part hereof and in which:

Figure 1, is a view in elevation principally sectioned of a lamp constructed in accordance with the invention. Fig. 2, is a view in horizontal section taken upon the line 2—2 of Fig. 1, and Fig. 3, is a perspective view, partly sectioned, of the hollow or tubular carbon.

In the practical embodiment of the invention the lamp fixture has been designed so that it may be readily and expeditiously attached to existing or ordinary types of arc lamps without reconstruction of the lamp parts, whereby the same may be converted into a so-called electric flame arc lamp to provide a cheap and efficient lamp. In the drawings, the casing or shell 1, of the arc lamp shown may be of any of the well-known types, the same being provided with the usual depending element 2, for supporting the outer globe 3. An ordinary carbon 4, operated by the usual feeding mechanism passes down through the element 2.

The above described parts are of ordinary and well-understood construction and constitute the upper part of an electric arc lamp and the new article of manufacture about to be described is designed for ready and expeditious attachment to such for enhancing the efficiency and commercial value thereof. It may be here remarked that an ordinary electric arc lamp may thus be used interchangeably as an arc lamp or a flame arc lamp. Adapted for detachable engagement with the underside of the element 2, as by bolts 5, is the lamp fixture of the invention. This fixture is made up first of a hollow casting 6, of relatively large cross section, one end of which is closed and the other end of which terminates in a depending gas conducting conduit 7, of relatively small cross section. This hollow casting 6, constitutes an upper gas chamber 8, which has free and unobstructed communication with the conduit 7. As shown the conduit 7, extends downward for a considerable distance and terminates in a flanged portion 9. Arranged centrally of the lamp fixture and below the casting 6, is a second hollow casting 10, of relatively large cross section terminating in an upwardly extending conduit 11, of a diameter equal to the diameter of the conduit 7, which terminates in a flanged portion 12, the said conduit 11, and conduit 7, inter-communicating and being suitably secured together, for instance by means of bolts 13, passing through the respective flanges of said conduits. The hollow casting 10, constitutes a lower gas chamber 14, which has free and unobstructed relation with the conduit 11. As shown in Fig. 1, this gas chamber 14, terminates at its top in a contracted orifice 15, the purpose of which will presently appear. The inner walls of the hollow casting 10, are extended upwardly above and around the contracted orifice 15, and the outer walls are internally screw-threaded as at 16, to receive an adjustable base 17. Between the base 17, and the casting 6, there is provided a glass chimney or the like 18, forming an arc inclosing chamber. It may be here mentioned that the base 17, is provided with an annular flanged portion 19, and the casting 6, with an annular flanged portion 20, to accommodate and center the chimney 18, and at the same time provide a substantially air tight connection.

As shown in Fig. 1, that portion of the lower casting 10, which terminates in the contracted orifice 15, is annularly flanged as at 21, to form a seat to receive the tubular carbon 22. This tubular carbon 22, comprises a pair of hollow pencils of carbon having nested relation with one another, the inner pencil forming the central passage 25, therethrough. A filling of carbon and light producing salts is present between the inner and outer walls of the respective hollow pencils, see Fig. 3. As shown in Fig. 1, the passage 25, of the above described carbon registers with the contracted orifice 15, of the lower chamber 14. By so arranging and constructing the carbon, the vapors, gases and smoke given off by the carbons are caused by the heat of the arc to pass upward to the chamber 8, and thence be carried over into and down through the conduits 7, and 11, to the lower chamber 14, where at once they pass up through the passage 25, of the carbon and are entirely consumed by the arc. Thus a continuous cycle of heated gases pass around and through the lamp and are entirely consumed as they issue out of the top of the lower or hollow carbon. Obviously, as the heated gases are consumed an intense and steady light is maintained. If desired, air may be admitted to the lower chamber 14, by virtue of the needle valve 27. The chimney 18, should be maintained in a substantially air tight manner at the top and bottom of the lamp fixture. To accomplish this result some of the lamp parts must be free to be moved to allow for expansion and contraction of the lamp fixture parts. To provide for this expansion and contraction, use is made of the adjustable base 17. Obviously, by turning the base 17, with respect to its screw-threaded connection, the chimney 18, may be properly caused to retain its substantially air tight position.

In order that the lamp fixture parts may be readily disassembled the conduit 7—11 has been made two-part. Thus when desired, by removing the bolts 13, the conduit 11, including the base 17, and chimney 18, may be readily removed from the upper part of the lamp fixture. In order that the lamp fixture may appear sightly when in position the outer globe 3, is present. By virtue of the symmetrical lines of the conduit 7—11, it is possible to utilize the ordinary globe of an arc lamp which obviously is important, in that it renders the lamp as a whole sightly thereby adding to its commercial value. It may be here remarked it is desirable in a lamp fixture of the kind just recited that an efficient circulation of gases or vapors be maintained at all times and that condensation be reduced to a minimum in the conduit 7—11 and thereby deposit little or no carbon upon the conduit walls. By having the inlet end of the conduit relatively large and the outlet end relatively small increased velocity of gases is maintained through and around the lamp fixture thus providing in effect a self-cleaning conduit.

What I claim is:

1. The combination in an arc lamp including its complemental upper carbon of a lower carbon having a vertical passage entirely therethrough, a transparent or translucent chamber for inclosing said carbons said chamber having an open top and a closed bottom, a separable conduit the parts of which are coupled together, said conduit having a relatively large inlet and a relatively small outlet connecting the upper portion of said chamber with the lower portion of the hollow carbon, the conduit outlet being in direct communication with the vertical passage in said hollow carbon whereby the gases given off from the carbon are caused to pass in a continuous cycle through the lower carbon and around said lamp said gases being entirely consumed as they issue from the carbon top.

2. The combination in an arc lamp including its complemental solid carbon of a hollow carbon disposed below the solid carbon, a transparent or translucent chamber for inclosing said carbons said chamber having an open top and a closed bottom, a two part relatively vertically disposed separable conduit having a relatively large inlet and a relatively small outlet connecting the upper part of said chamber with the lower part of and being in direct communication with the hollow carbon and means for coupling said conduits together.

3. In an arc lamp the combination of a two part separable conduit having fixed relation with the lamp structure said conduit having a relatively large inlet and a relatively small outlet, means for coupling together the conduit parts, a carbon having a vertical passage therethrough carried by the outlet end of the conduit said passage being in direct communication with said conduit, an adjustable base piece also carried by the outlet end of the conduit and a chimney interposed between said base piece and the top of said conduit said chimney serving as a substantially air tight arc inclosing chamber.

4. In an arc lamp the combination of a two part separable conduit having fixed relation with the lamp structure said conduit having a relatively large inlet and a relatively small outlet, means for coupling together the conduit parts, a carbon having a vertical passage therethrough carried by the outlet end of the conduit said passage being in direct communication with said conduit, a base piece adjustably carried by the outlet end of the conduit, a chimney between said base piece and the conduit top forming a substantially air tight arc inclosing chamber and a globe inclosing entirely said chamber and conduit.

5. In an arc lamp the combination of an arc inclosing chamber, the top of which is open and the bottom closed, a conduit having a relatively large inlet and a relatively small outlet connecting the top and bottom of said chamber said conduit being located outside the arc inclosing chamber, a hollow carbon forming one of the electrodes of the arc penetrating the closed bottom of said chamber and establishing communication between said chamber and said conduit and an outer globe for inclosing entirely said chamber and conduit.

6. As a new article of manufacture, a lamp fixture comprising a separable conduit having a relatively large inlet and a relatively small outlet which outlet is formed for the reception of a hollow carbon, means for coupling together the conduit parts, a base piece adjustably supported by the outlet end of the conduit and a chimney interposed between said base piece and the conduit top.

In testimony whereof I have hereunto signed my name.

HENRY G. DYER.

Witnesses:
AGNES E. CASKEY,
WILLIAM J. JACKSON.

Copies of this patent may be obtained for five cents each, by addressing the "Commissioner of Patents. Washington, D. C."